United States Patent [19]
Miller

[11] Patent Number: 5,627,419
[45] Date of Patent: May 6, 1997

[54] SELF-ADJUSTING AIRGAP MOTOR/ GENERATOR FOR FLYWHEEL SYSTEM

[75] Inventor: Robin M. Miller, Ellington, Conn.

[73] Assignee: United Technologies Corporation, Hartford, Conn.

[21] Appl. No.: 220,778

[22] Filed: Mar. 31, 1994

[51] Int. Cl.$^6$ ..................................... H02K 7/02
[52] U.S. Cl. ........................... 310/74; 310/153; 310/191; 310/209; 290/38 A
[58] Field of Search ............... 310/74, 94, 157, 310/153, 191, 209, 91; 290/15, 38 A; 322/4; 74/572

[56] References Cited

U.S. PATENT DOCUMENTS

| | | | |
|---|---|---|---|
| 1,131,551 | 3/1915 | Price . | |
| 2,666,509 | 1/1954 | Jaggi | 192/2 |
| 2,677,256 | 5/1954 | Donandt | 64/23 |
| 3,361,947 | 1/1968 | Schlebusch | 318/115 |
| 3,589,485 | 6/1971 | Kajitani et al. | 192/18 B |
| 3,691,413 | 9/1972 | Russell | 310/41 |
| 4,233,521 | 11/1980 | Pouget | 290/38 B |
| 4,306,167 | 12/1981 | Tomite et al. | 310/153 |
| 4,920,295 | 4/1990 | Holden et al. | 310/209 |

FOREIGN PATENT DOCUMENTS

| | | |
|---|---|---|
| 2614367 | 10/1988 | France . |
| 5561 | of 1904 | United Kingdom . |
| 92/05617 | 4/1992 | WIPO . |

OTHER PUBLICATIONS

Campbell P., "Performance Calculation of a Permanent–Magnet Axial Field DC Machine Electric Power Application," vol. 2, No. 4, pp. 139–144 (1979) Figs. 2.14–2.24.

Primary Examiner—Thomas M. Dougherty
Assistant Examiner—Jonathan Link
Attorney, Agent, or Firm—Gerald L. DePardo

[57] ABSTRACT

A flywheel system having permanent magnets 20 disposed on a flywheel 10 rotating about a shaft 12 is provided with a stator 28 having an outer diameter which is oriented concentrically and shaped conically within a similarly shaped inner diameter of the flywheel 10 (and the magnets 20) and the stator 28 is slidably and rotatably mounted to a shaft 30 thereby allowing a gap $g_1$ between the stator 28 and the rotor/flywheel 10 to be adjustable. When energy is being provided to (spin-up) or extracted from (spin-down) the flywheel 10, the stator is automatically forced to the left (FIG. 1) due to torque on the stator 28, thereby causing the gap $g_1$ to be small to provide strong electromagnetic interaction between the stator 28 and the flywheel 10. Conversely, when the flywheel 10 is freewheeling, the stator 28 is forced to the right by a spring 40 causing the gap $g_1$ to increase to a distance large enough to minimize electromagnetic drag on the flywheel 10.

5 Claims, 2 Drawing Sheets

SELF-ADJUSTING AIRGAP MOTOR/ GENERATOR FOR FLYWHEEL SYSTEM

CROSS REFERENCES TO RELATED APPLICATIONS

Copending U.S. patent application, Ser. No. (UTC Docket No. R-3732), entitled "Adjustable Airgap Motor/Generator For Flywheel System", filed contemporaneously herewith, contains subject matter related to that disclosed herein.

TECHNICAL FIELD

This invention relates to flywheels and, more particularly, to efficient freewheeling using an automatically adjustable airgap motor/generator.

BACKGROUND ART

It is known in the art to use a spinning inertial mass called a "flywheel" as an energy storage/retrieval system. It is also known to dump energy into the flywheel using electromagnetic force to "spin-up" or accelerate the flywheel to a predetermined rotational speed, such that it "stores" kinetic energy. The higher the speed, the more energy the flywheel stores. To spin-up the flywheel, the system acts in a motor type operation with the flywheel being the rotor. This stored kinetic energy can then be extracted from the spinning flywheel by use in a generator-type action using electromagnetic fields to "spin-down" or reduce the rotational speed of the flywheel.

When no energy is being input into the flywheel nor extracted from the flywheel, the flywheel is said to be "freewheeling" or in a "freewheeling" mode. During freewheeling, it is desirable to minimize the electromagnetic losses on the flywheel due to the motor/generator configuration, thereby avoiding extracting wasteful energy from the spinning flywheel. If such losses are not minimized, they cause the flywheel rotational speed to be reduced, thereby reducing the amount of energy available to be extracted.

Numerous configurations exist in the art for this motor/generator flywheel system. For example, permanent magnets may be located on the spinning rotor portion of the flywheel and motor coils may be located on a stationary or stator portion of the system. In that case, when the rotor is freewheeling, the coils are typically open-circuited through some maximum impedance to minimize the current and to minimize the amount of electromagnetic force generated in the coils, thereby minimizing the amount of energy extracted from the rotor during freewheeling. However, even though the coils are open-circuited, eddy currents are still generated due to the rotating permanent magnets of the flywheel, thereby generating some magnetic fields which extract energy from the flywheel and reduce its speed.

Thus, it would be desirable to design a flywheel motor/generator system that minimizes electromagnetic drag on the flywheel during freewheeling.

DISCLOSURE OF INVENTION

Objects of the invention include provision of a flywheel system which minimizes electromagnetic drag on the flywheel during freewheeling operation.

According to the present invention a flywheel system, includes a first shaft having a longitudinal axis; flywheel means, comprising a flywheel capable of rotating about the shaft having a flywheel inner diameter, a plurality of permanent magnets disposed in the flywheel inner diameter, and the flywheel means having an inner diameter which is tapered; at least one bearing which facilitates the rotating of the flywheel about the first shaft; a second shaft having substantially the same longitudinal axis as the first shaft; and a stator, disposed on the second shaft, having a stator outer diameter disposed at least partially within the inner diameter of the flywheel means, which couples electro-magnetic energy to and from the flywheel means and which moves axially along the longitudinal axis; the stator outer diameter and the inner diameter of the flywheel means having shapes that create an adjustable gap between the stator and the flywheel means as the stator moves axially along the longitudinal axis the stator being rotatable about the longitudinal axis; self-engaging means for automatically decreasing the gap in response to electromagnetic torques exerted on the stator when the flywheel is being spun-up and spun-down, thereby increasing electromagnetic forces between the stator and the flywheel; and self-disengaging means for automatically increasing the gap when the flywheel is freewheeling, thereby decreasing electromagnetic drag on the flywheel.

According further to the present invention, the stator also moves rotatably about the longitudinal axis. According still further to the invention, self-adjusting means are provided for automatically decreasing the gap in response to electromagnetic torques exerted on the stator when the flywheel is being either spun-up or spun-down or both, and for automatically increasing the gap when the flywheel is freewheeling.

According still further to the invention, the adjustable gap is set to exert minimal electromagnetic drag on the flywheel when the flywheel is freewheeling.

The invention represents a significant improvement over prior motor/generator flywheel systems by providing uni or bi-directional automatic engagement and/or disengagement of the motor/generator between the stator and rotor/flywheel without the need for any mechanical linkages. The stator is disposed on a shaft which has a (uni- or bi-directional spiral that allows the stator to rotate about the shaft and move longitudinally as it rotates, due to angular torques caused by electromagnetic forces exerted by the motor/generator action. When the system is either in spin-up (motor) or spin-down (generator) mode, the stator automatically slides toward the smaller portion of the cone shape thereby causing the gap between the stator and rotor to decrease and allowing efficient motor/generator action. When in freewheeling mode, the torque is greatly reduced and an axial spring forces the stator to the larger portion of the cone thereby increasing the gap and minimizing electromagnetic drag on the rotor.

The invention may be used on any flywheel application such as any land, air, sea, or space vehicle, as well as appliances such as air conditioners, and moving carriers such as elevators.

The foregoing and other objects, features and advantages of the present invention will become more apparent in light of the following detailed description of exemplary embodiments thereof as illustrated in the accompanying drawings.

BEST MODE FOR CARRYING OUT THE INVENTION

Figure 1:
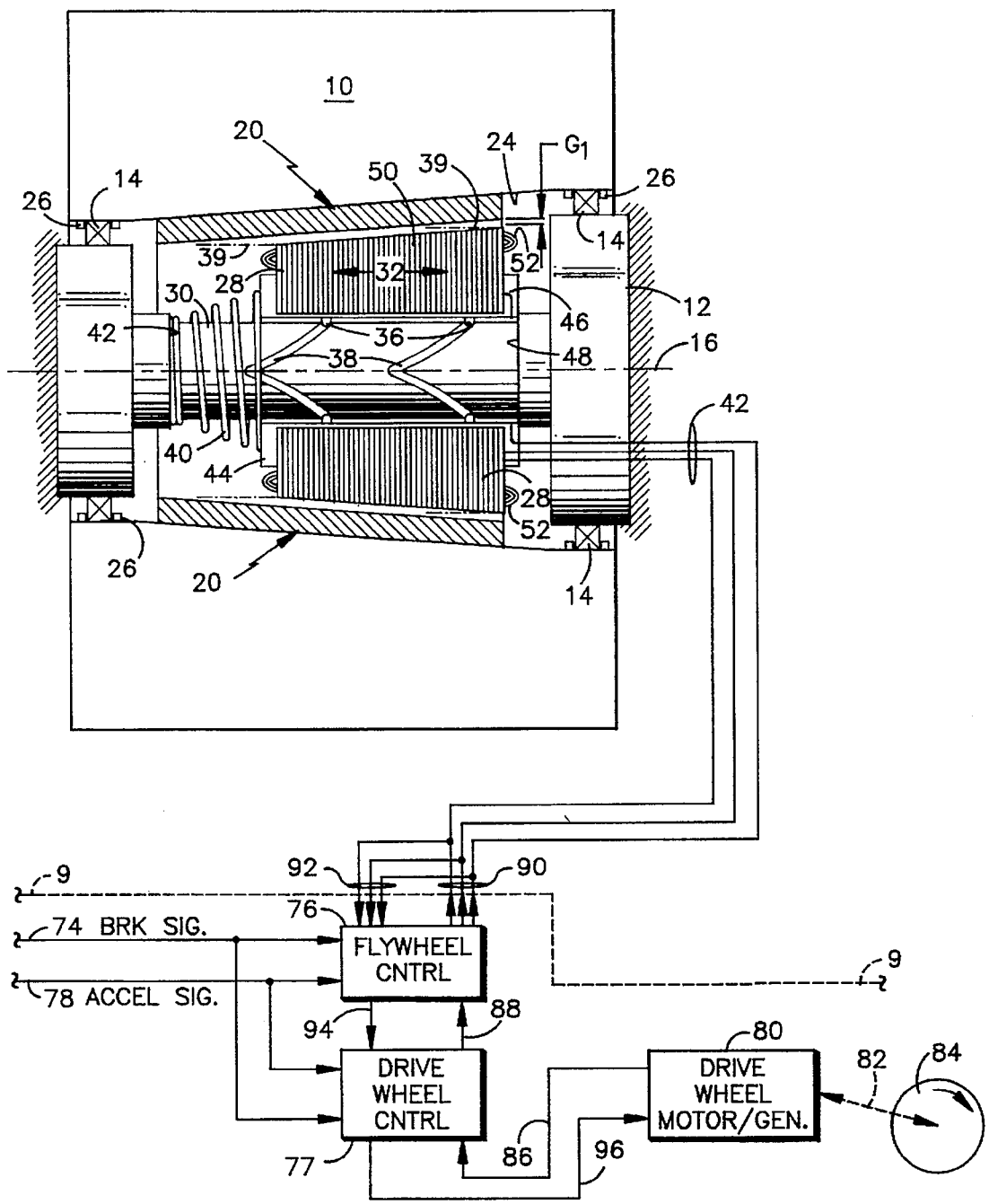
FIG. 1 is a cut-away side view of a self-adjusting airgap motor/generator flywheel system, in accordance with present invention.

Referring to FIG. 1, the hardware below the line 9 is known in the art. A self-adjusting airgap motor/generator flywheel system comprises an inertial wheel 10 (or flywheel). The flywheel 10, rotates about a shaft 12 by use of bearings 14, about a longitudinal axis 16. The bearings 14 may be sleeve, air, magnetic, rolling element or superconducting bearings or any other type of bearing that allows the flywheel 10 to spin about the shaft 12. The shaft 12 is affixed to ground and does not rotate; however, it may rotate if desired.

A plurality of permanent magnets 20 (generally), are attached to an outer surface 24 of the inner diameter of the flywheel 10. The permanent magnets 20 on the flywheel 10, comprise a rotor portion of a Brushless DC motor/generator. The permanent magnets 20 are about 10% longer than the stator 28, but are shown to be longer for illustrative purposes. Other lengths may be used if desired. Also, pins 26 are provided to keep the flywheel from moving in an axial direction along the axis 16. Other types of support maybe used to prohibit axial movement if desired. Alternatively, the magnets 20 may be partially or totally embedded in the flywheel 10.

A stator 28 portion of the motor/generator slides axially along a narrower shaft portion 30 of the shaft 12, as indicated by the arrow 32. The outside diameter of the stator 28 and the inner diameter of the flywheel are shaped like a shallow cone and are concentric with each other. As a result, an airgap $g_1$ exists between the stator 28 and the permanent magnets 20 which varies based on the axial position of the stator 28 along the shaft 30.

The stator 28 has teeth 36 which slide on grooves 38 (or slots) cut in the shaft 30. The contour of the grooves 38 is such that if the stator 28 turns about the longitudinal axis 16 of the shaft 30 in either direction (clockwise or counterclockwise), the stator 28 will be forced axially to the left, thereby reducing the gap $g_1$. This is also known as a bi-directional spiral, discussed more hereinafter. The travel path of the outer edges of the stator 28 are indicated by dashed lines 39. Alternatively, the shaft may have ribs instead of grooves and the inner diameter of the stator 28 may have the grooves.

An axial spring 40 is wound around the shaft 30 and pushes against a ridge 42 (or stop or lip) and a left stator cap 44. The spring 40 is provided to put a left-to-right force on the stator 28. When the stator 28 is located all the way to the right, a right stator cap 46 of the stator 28 pushes against a ridge 48 (or stop or lip). Also, the stator 28 contains laminations 50 and coils 52 which define three phases (A,B,C) of operation for the motor/generator, discussed hereinafter. The right stator cap 46 allows three sets of wires 42, for the three phases of the motor/generator, to interface with external components. The flywheel 10, the shaft assembly 12,30, the bearings 14, and the stator 28 may be housed in an evacuated chamber (not shown) if desired.

The dynamic operation of the system is as follows. A brake signal on a line 70 and an accelerator signal on a line 72 provide signals indicative of brake or accelerator pedals (not shown), respectively, for a vehicle, e.g., an automobile or bus, and are fed to a flywheel control circuit 76 and a drive wheel control circuit 77. The flywheel control circuit 76 and drive wheel control circuit 77 contain known electronic components, e.g., op-amps, transistors, etc., capable of performing the functions described herein. The actual detailed implementation of such functions is well known in the art and is not critical to the present invention.

When either the brake signal or the accelerator signal indicate the associated pedal have been depressed beyond a predetermined threshold, the system is in spin-up or spin-down mode, respectively. When neither pedal is depressed, the system is freewheeling.

The operation and interaction with the flywheel control circuit 76 and the drive wheel control circuit 77 is as follows. When the brake signal indicates that the brake pedal is depressed, the flywheel system enters spin-up mode. In this mode, a drive wheel motor/generator 80 is electromagnetically and/or mechanically engaged as indicated by the dashed line 82 to a rotating wheel 84. The drive wheel motor/generator 80, extracts energy from the rotating wheel 84 to provide voltage on lines 86 to the drive wheel motor/generator control circuit 77. The drive wheel motor/generator engagement may be initiated by the drive wheel motor/generator control 77. The electrical signals from the drive wheel motor/generator 80 are signal conditioned by the control circuit 77 and appropriate electrical source signals are provided to the flywheel motor/generator control circuit 76 on lines 88. In this mode of operation, the flywheel control circuit 76 provides output drive signals on lines 90 to the coils 52 of the stator 28 of the flywheel motor/generator. The drive signals on the lines 90 then spin-up the flywheel 10 in a motor-driving fashion. This causes a rotational force to be exerted on the stator 28, in the opposite direction to the rotation of the flywheel 10, thereby causing the stator 28 to be pulled to the left causing the gap $g_1$ to be reduced and allowing electromagnetic "engagement" of the stator 28 and the rotor/flywheel 10.

Conversely, when the brake signal on the line 70 indicates that the brake pedal is no longer depressed, the system reverts to "freewheeling" operation, and the brake signal on the line 70 changes to indicate to the flywheel control circuit 76 to stop dumping energy into the flywheel 10. In that mode, the drive wheel control circuit 77 disengages the drive wheel motor 80 and the flywheel control circuit 76 stops providing the drive signals on the lines 90 and open-circuits the lines 90 to provide a maximum impedance path across the coils, thereby reducing current generation in the coils. As a result, no rotational electromagnetic forces are exerted on the stator 28, thereby allowing the stator 28 to be pushed to the right by the spring 40, thereby automatically increasing the gap $g_1$ and minimizing any electromagnetic drag on the flywheel 10.

When the accelerator signal on the line 72 indicates that the accelerator pedal is depressed, the system enters a spin-down mode where power is extracted from the flywheel 10. In that mode, the flywheel control circuit 76 monitors lines 92 for the back EMF voltage generated in the coils 52 of the stator 28 by the rotating permanent magnets 20 in the flywheel 10.

The back EMF voltage signals on the lines 92 are converted by the flywheel control circuit 76 to source voltage signals on lines 94 to the drive wheel control circuit 77. The drive wheel control circuit 77 signal conditions the source voltage from the flywheel control circuit 76 and provides drive signals on lines 96 to the drive wheel motor/generator 80 which causes the wheel 84 to increase in rotational speed. Because energy is being extracted from the flywheel 10, a rotational force is exerted on the stator in the direction of flywheel rotation, causing the stator 28 to be forced to the left, thereby automatically decreasing the gap $g_1$ to provide efficient electromagnetic interaction between the stator 28 and the rotor 10.

Similarly, when the accelerator pedal is released, the system enters "freewheeling" operation. In that mode, because no electromagnetic forces are acting on the stator 28, the spring 40 pushes the stator 28 to the right, which increases the gap $g_1$, thereby disengaging the stator 28 from the flywheel 10 and the system enters "freewheeling" operation. In particular, the acceleration signal on the line 72 indicates to the flywheel control circuit 76 to discontinue monitoring the signals on the lines 92 and providing the output source signal on a line 94 to the drive wheel control circuit 77.

Thus, when either the brake signal or the accelerator signal indicates the associated pedal has been depressed beyond a predetermined threshold, the stator 28 is automatically forced to the left against the stops 42, thereby reducing the gap $g_1$. In this position, the airgap $g_1$ is small enough to allow optimal electromagnetic interaction between the stator 28 and the rotor 10, thereby causing the stator 28 to be "engaged" with the flywheel/rotor portion of the motor to feed energy into (i.e., spin-up) the flywheel 10 (when the brake pedal is depressed) and to extract energy from the flywheel 10 (when the accelerator pedal is depressed).

Similarly, when neither the brake pedal nor the accelerator pedal are depressed the spring 40 automatically forces the stator 28 to the right, thereby increasing the gap $g_1$. In this mode, the flywheel 10 is in "freewheeling" mode and the stator 28 of the motor is "disengaged" from the spinning flywheel 10 or rotor portion of the motor/generator. The gap $g_1$ during disengagement is set to be large enough to minimize the amount of electro-magnetic interaction between the flywheel and the stator.

More specifically, the amount of electromagnetic force exerted on the flywheel 10, is determined by the gap $g_1$ between the stator 28 and the flywheel 10. The gap $g_1$ is about 0.3 inches minimum when the flywheel is disengaged and about 0.1 inches when the flywheel is engaged. Other gap values may be used if desired and will depend on the size and strength of the magnets.

This design allows for very efficient freewheeling by the increased gap $g_1$, thereby minimizing the amount of electromagnetic drag on the flywheel 10 when it is in the freewheeling mode. Also, it provides this feature without requiring any mechanical linkages to engage or disengage the stator and rotor.

It should be understood that when the flywheel control circuit 76 is driving the coils 52 in a motor-driving fashion, the type of commutation used is not critical to the invention. For example, the lines 92 may be monitored for back EMF to sense the position of the rotor using well known commutatorless brushless dc motor drive techniques. Alternatively, well known position sensors (not shown), e.g., Hall effect, optical, capacitive, or inductive sensors, may be employed to provide signals on lines (not shown) to the flywheel control circuit 76. Where position sensors are used, they may be located, e.g., on the shaft 12 or the smaller shaft 30 and on the rotor 10 where it is convenient. Alternatively, the sensors may detect position of the outer surfaces of the rotor 10, instead of the inner diameter 24 region.

For example, when an optical sensor is used, a section of the rotor may be painted with reflective paint and an optical source and sensor mounted to a stationary element (e.g., the shaft 12) and pointed toward the spinning rotor 10. When the light is incident on the reflective region it reflects the light to the sensor and the sensor produces a signal indicative thereof; otherwise, the signal is not present. Alternatively, when Hall effect sensors are used, a magnetic piece or strip may be attached to or embedded in the rotor 10 and the sensor attached to any element which is not the rotor 10.

Figure 2:
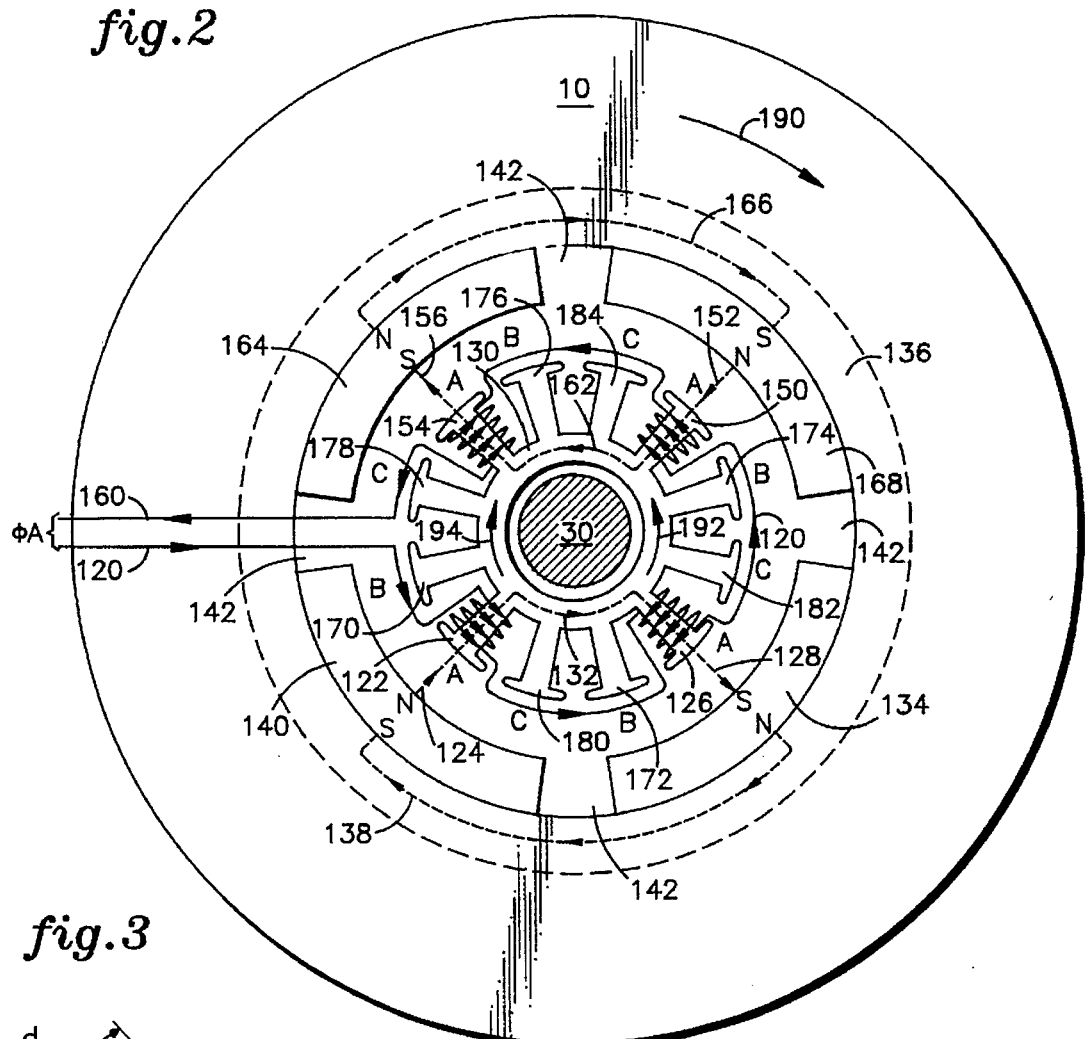
FIG. 2 is a cut-away top view of the self-adjusting motor/generator flywheel system, in accordance with present invention.

Referring now to FIG. 2, a top view of the invention shows the magnetic flux paths and the specific coil windings and laminations. Regarding Phase A (øA), the electric current propagates along a wire 120 to a laminated post (or tooth) 122. The wire 120 is wrapped around the laminated post 122 such that the magnetic field is radially inward, as indicated by a line 124. The wire 120 exits the post 122 and is fed to a post 126 around which the wire 120 is wound in the opposite direction, so as to create a magnetic field radially outward, as indicated by a line 128.

The magnetic flux travels from the post 122 through a laminated stator back iron 130, as indicated by a line 132, to the post 126, across the gap $g_1$, as indicated by the line 128, to the south pole of a permanent magnet 134 in the flywheel 10. Flux exits the north pole of the magnet 134 and travels along a magnet backing region 136, as indicated by a line 138, to the south pole of a permanent magnet 140. The flux exits the north pole of the magnet 140 and travels across the gap $g_1$, as indicated by the line 124, to the post 126 to complete the flux path.

The magnet backing region 136 is made from a magnetically conductive material, e.g., iron. The entire flywheel 10 may be made of this material if desired. However, the regions 142 between the magnets should be made of a non-magnetic conductive material to prevent the north and south poles of a given magnet from magnetically shorting together. Also, the spacing 142 between the magnets, should be at least greater than the depth (radial) dimension of the magnet to minimize losses.

Regarding a second flux path for Phase A (øA), the wire 120 leaves the post 126 and is fed to a post 150. The wire is wrapped around the post 150 to cause a magnetic field in a direction radially inward as indicated by a line 152. From the post 150, the wire 120 is fed to another post 154 and is wound in the opposite direction to cause a magnetic field radially outward, as indicated by a line 156. The wire then returns as a return wire 160 which makes up the other side of Phase A.

In a similar fashion to the first flux path for Phase A described hereinbefore, the coil around the post 150 produces a magnetic flux field which exits the post 150 and travels along the stator back iron 130 to the post 154 as indicated by a line 162, to the post 154, across the gap $g_1$, as indicated by a line 156, to the south pole of a permanent magnet 164. The flux exits the north pole of the magnet 164 and travels along the backing portion 136 behind the permanent magnets in the flywheel 10, as indicated by a line 166, to a south pole of a permanent magnet 168. Flux exits the north pole of the permanent magnet 168 and travels across the gap $g_1$, as indicated by the line 152, back to the post 150 to complete the flux loop.

It should be understood that the stator back iron 130 and the posts (or teeth) of the stator 28 discussed hereinbefore are typically laminated metal to provide good magnetic field conductivity.

A similar arrangement exists for Phase B (øB) with the posts 170, 172 and the posts 174, 176 (coils not shown). Also, a similar arrangement exists for Phase C (øC) with the posts 178,180 and the posts 182,184 (coils not shown).

To cause the flywheel 10 to rotate about the shaft 16 in a direction indicated by the line 190 starting in the position indicated on FIG. 2, Phase A is de-energized and Phase B is energized which causes the flux path 124,132, 128,138 to move clockwise from the poles 122,126 to the poles 170,172 which causes the flywheel 10 to rotate slightly clockwise in the direction of the line 19. Then, Phase B is de-energized and Phase C is energized which causes the flux path 124, 132,128,138 to move to the poles 178,180. Then, Phase C is de-energized and Phase A is again energized to complete the cycle. A similar movement occurs with the flux path 156, 166,152,162. This Phase driving operation is well known in the art for driving a permanent magnet rotor.

Instead of the coils being wrapped individually and independently around each post as indicated in FIG. 2, an overlapping form of winding arrangement may be used where the wire is wrapped around two posts having a plurality of posts in between. For example, for Phase A, the wire 120 may be wrapped from the post 122 around the post 178 with the post 170 being in between and the wire also wrapped in the opposite direction from the post 126 around the post 180 and back to 126 again, having the post 172 in the middle. In that case, Phase B would be wrapped from the post 170 around the post 154 with the post 178 in the middle and oppositely wound around the post 172 and the post 122, having the post 180 in the middle. A similar arrangement would exist for Phase C.

Many other winding configurations and number of phases exist in the art any of which will work equally well for the present invention, such as that shown in FIG. 2.14 of the book Campbell P., "Performance Calculation of a Permanent-Magnet Axial Field DC Machine Electric Power Application," Vol.2, No. 4, pp139–144 (1979). It should be understood that the illustrated version shown in FIG. 2 is merely shown for clarity of demonstrating the invention. Also, other shapes for the flywheel may be used if desired.

Regarding the rotational torques on the stator 28 and the automated engagement and disengagement of the stator and rotor/flywheel, discussed hereinbefore, the following discussion is provided in the context of FIG. 2 for further clarity. When the flywheel 10 is rotating clockwise as indicated by the line 190, and the system is in spin-up mode, a torque is exerted on the stator 28 in a counterclockwise direction, as indicated by the line 192. In that mode, the stator 28 rotates in the direction 192 of the torque and slides along the grooves 38 (FIG. 1) which reduces the gap $g_1$ to allow efficient electro-magnetic interaction between the stator 28 and the rotor/flywheel 10.

Similarly, when the flywheel 10 is rotating clockwise as indicated by the line 190, and the system is in spin-down mode, the torque applied to the stator 28 is clockwise as indicated by the line 194. In that mode, the stator 28 rotates in the direction 194 of the torque and slides along the grooves 38 (FIG. 1) to reduce the gap $g_1$ to allow efficient electromagnetic interaction between the stator 28 and the rotor 10.

Thus, when in either spin up or spin-down mode the torque applied to the stator 28 causes the stator to self-engage with the flywheel 10. Also, when in freewheeling operation, no torque is on the stator 28 and the spring 40 (FIG. 1) forces the stator 28 to the right, thereby increasing the gap g1 to minimize electromagnetic drag on the flywheel 10, as discussed hereinbefore.

It should be understood that because the rotor/flywheel permanent magnets are disposed against the inner diameter of the flywheel, there is no need to embed the magnets within the flywheel because the centrifugal force (radially outward) of the spinning flywheel will cause the magnets to stay in place.

Figure 3:
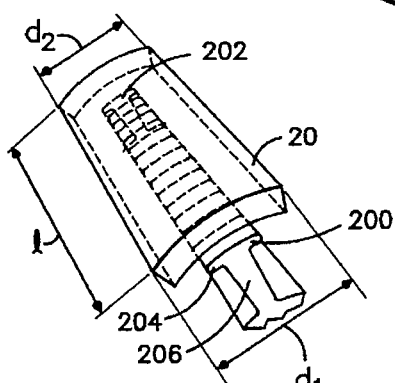
FIG. 3 is a perspective cut-away view of one pole and one permanent magnet of the motor/generator flywheel system, in accordance with present invention.

Referring now to FIG. 3, because the outer diameter of the stator 28 and the inner diameter of the rotor/flywheel 10 are concentric in orientation and conical (or tapered) in shape, the permanent magnets 20 (generally), have a larger dimension d1 (on the right of FIG. 1) than the dimension d2 (on the left of FIG. 1). A similar situation exists for the laminations 200,202. In particular, the lamination 200 at the far right of FIG. 1 will have a larger head 204 than that of the laminations to the left thereof. Also, to maintain a constant gap over the length 1 of the stator 28, a neck region 206 of the laminations is longer than that of the laminations to the left thereof. This can also be seen by examining FIG. 1 where the radial dimension of the laminations 50 on the right side of the stator 28 are slightly longer than those to the left.

Figure 4:
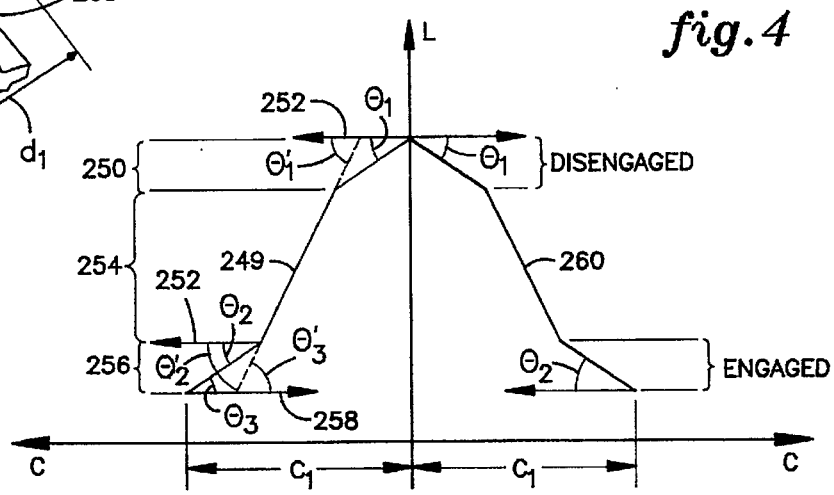
FIG. 4 is a graph of axial shaft length (L) vs. shaft circumference (C) and shows a bi-directional contour along the circumference and length of the shaft along which a stator moves, in accordance with present invention.

Referring to FIG. 4, a contour 249 of the bi-directional spiral grooves 38 along the shaft 30 has a region 250 (at a disengaged end of the contour) that makes an angle $\theta_1$, e.g., 30 degrees, relative to a force vector 252 generated by torque on the shaft 30. This requires a predetermined amount of initial torque to be exerted on the stator 28 before the stator 28 will begin to rotate about the shaft 30 and travel toward the engaged end. Other angles may be used if desired. For example, a steeper angle $\theta_1'$, e.g., 60 degrees, may be used which would require more torque on the stator 28 before it would begin to move along the shaft 30.

After exiting the region 250, a region 254 is entered having a larger angle relative to the force vector 252, which allows more significant travel along the length (L) with much less rotation. Travel along the region 254 requires more torque applied to the stator 28 than for the region 250, but some momentum is created during the travel along the region 250, thereby not necessarily requiring more overall input torque on the stator 28.

Lastly, when the stator 28 reaches the engaged portion of the contour, a region 256 makes an angle $\theta_2$, e.g., 30 degrees, relative to the force vector 252, thereby allowing the stator to easily slide into the engaged section. In that case, when the torque on the stator 28 creates a force vector 258, in order to slide toward the disengaged region, a predetermined amount of initial torque must be exerted on the stator 28. This torque is determined by the angle $\theta_3$, which is always equal to $\theta_2$, e.g., 30 degrees, because the force vectors 252,258 are parallel making them alternate interior angles. Alternatively, the angle $\theta_3$ may be a more steep angle $\theta_3'$ which causes a corresponding angle $\theta_2'$ to also be more steep, thereby requiring more torque to slide into and out of the engaged region 256. Other angles may be used if desired.

A symmetric contour 260 is provided for stator torques in the other direction. Other shapes for the contours 249,260 may be used that require more or less torque at each regions 250,254,256 along the contour, if desired. The design of the contour shape must take the return force of the spring 40 (FIG. 1) into account. Also, although FIG. 4 shows a straight line for each region, it should be understood that the contour may likely by curved. Further, more or less regions may be used if desired.

The contour causes a movement along the circumference $C_1$ of the outer diameter of the shaft 30 which causes a rotation of about 45 to 60 degrees of the stator 28 about the shaft 30 and about ¼ of the diameter of the shaft 30. Other amounts of rotation and movement may be used if desired.

Also, viscous damping or other damping may be provided to the shaft 30 (FIG. 1) and/or the stator 28 to prevent the spring 40 from immediately pushing back the stator.

Referring again to FIG. 1, instead of the spring 40 being located between the stator 28 and the lip 42, any means may be used to apply a force on the stator 28 such that when not in spin-up or spin-down modes, the stator 28 is pushed to the right (or the larger portion of the cone shape) to a maximum gap $g_1$ spacing. For example, the spring 40 may be placed between the stator 28 and the lip 48. Other locations for such means may be used if desired.

Even though the invention has been shown as being used with an automobile, the invention may be used in any energy storage/retrieval system, e.g., elevators, air conditioners, any land, air, water, or space vehicles, and utility/energy providers, among others. For example, in an elevator application, energy from the weight of the car on descent could be used to spin-up the flywheel instead of using the rotating car wheel, which can then be extracted upon ascent.

It should be understood that the means for invoking which mode (i.e., spin-up, spin-down, or freewheeling) the system should run in, i.e., brake and/or accelerator pedals, the means for electrically interfacing with the stator 28 (FIG. 1), i.e., the flywheel control circuit 76, and the means from which the energy is extracted (in spin-up mode) and to which the energy is provided (in spin-down mode), i.e., the drive wheel motor/generator, are not critical to the invention.

Also, it should be understood that instead of automatic engagement and disengagement mechanical linkages or devices (not shown) may be employed to manually slide the stator along the shaft 16 to adjust the gap $g_1$. For example, a mechanical connection such as that discussed in copending U.S. patent application, Ser. No. (UTC Docket No. R-3732), entitled "Adjustable Airgap Motor/Generator For Flywheel System", filed contemporaneously herewith, may be used. In that case, instead of the bi-directional spiral on the shaft 16, a sleeve bearing, or other bearing that allows the stator 28 to slide along the shaft 16, may be used if desired.

Also, even though the shaft 12 is shown as being attached to the shaft 30, they need not be attached to each other. It is only required for the longitudinal axes of both shafts to be substantially the same.

Further, instead of a bi-directional spiral on the shaft 30, a uni-directional spiral may be used to provide automatic coupling either during spin-up or during spin-down (but not both), depending how the contour on the shaft 30 is designed, and automatic de-coupling during freewheeling. In that case, only one side of the symmetric contour of FIG. 4 need be provided.

Still further, instead of the inner flywheel/magnet diameter and the outer stator diameter being conical (or tapered) with a circular cross-section (FIG. 2), other cross-sectional shapes may be used if desired provided stator is located at least partially inside the inner diameter of the flywheel/rotor and the gap between the stator and rotor changes as the stator slides along a substantially common longitudinal axis. For example, the cross-sectional shape of the stator may be only partially circular and partially flat.

Also, the stator outer diameter need not be totally within the flywheel (and/or the permanent magnets) inner diameter. In particular, the stator may be within the flywheel inner diameter when engaged and then pull out from within the flywheel (and/or the permanent magnets) when not engaged. For example, the right side of the shaft 12 (FIG. 1) would have a hole in it to allow the stator to slide through it and the right stop 48 would be located to the right of the shaft 12. Alternatively, the stator may pull away from the permanent magnets but still be within the flywheel inner diameter.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A flywheel system, comprising:
   a first shaft having a longitudinal axis; flywheel means, comprising:
      a flywheel capable of rotating about said shaft having a flywheel inner diameter;
      a plurality of permanent magnets disposed in said flywheel inner diameter; and
      said flywheel means having an inner diameter which is tapered;
   at least one bearing which facilitates said rotating of said flywheel about said first shaft;
   a second shaft having substantially the same longitudinal axis as said first shaft;
   a stator, disposed on said second shaft, having a stator outer diameter disposed at least partially within said inner diameter of said flywheel means, which couples electromagnetic energy to and from said flywheel means and which moves axially along said longitudinal axis;
   said stator outer diameter and said inner diameter of said flywheel means having shapes that create an adjustable gap between said stator and said flywheel means as said stator moves axially along said longitudinal axis;
   said stator being rotatable about said longitudinal axis;
   self-engaging means for automatically decreasing said gap in response to electromagnetic torques exerted on said stator when said flywheel is being spun-up and spun-down, thereby increasing electromagnetic forces between said stator and said flywheel; and
   self-disengaging means for automatically increasing said gap when said flywheel is freewheeling, thereby decreasing electromagnetic drag on said flywheel.

2. The flywheel system of claim 1, wherein said self-engaging means comprises grooves having a bi-directional contour embedded in said second shaft.

3. The flywheel system of claim 1 wherein said self-disengaging means comprises an axial spring around said second shaft.

4. The flywheel system of claim 1, wherein said adjustable gap is set to exert minimal electromagnetic drag on said flywheel when said flywheel is freewheeling.

5. The flywheel system of claim 1, wherein said stator comprises a plurality of coils wound around laminations to create a plurality of electrical phases.

* * * * *